United States Patent Office 2,829,172
Patented Apr. 1, 1958

2,829,172

ALKYLHALOPENTENYL SULFIDES

Earl William Lane, Philadelphia, Pa., assignor to Rohm & Haas Company, Philadelphia, Pa., a corporation of Delaware No Drawing. Application July 19, 1955
Serial No. 526,070

12 Claims. (Cl. 260—609)

This invention relates to alkylhalopentenyl sulfides as new compositions of matter. It further relates to a method of preparation of these alkylhalopentenyl sulfides.

The present invention is concerned with the preparation of alkylhalopentenyl sulfides by reacting the corresponding alkylhalomethyl sulfides with butadiene in the presence of a Friedel-Crafts catalyst. The alkylhalopentenyl sulfides of the present invention may be represented by the formula $RSCH_2CH_2CH=CHCH_2X$, in which R is an alkyl group of one to eighteen carbon atoms and X is either chlorine or bromine.

This application is a continuation-in-part of my copending application Serial Number 443,153, filed July 13, 1954, now abandoned.

The starting compounds employed in the instant method, the alkylhalomethyl sulfides, are known and usually prepared by the halomethylation of a thioalcohol.

The present method concerns the reaction between an alkylhalomethyl sulfide and butadiene, in a one-to-one ratio, to form an alkylhalopentenyl sulfide having the formula $RSCH_2CH_2CH=CHCH_2X$, defined above. Typical of the alkyl groups that may be employed as R are methyl, ethyl, propyl, butyl, isobutyl, hexyl, octyl, isooctyl, tert-octyl, nonyl, decyl, isodecyl, tert-decyl, dodecyl, tetradecyl, and octadecyl. The X in the formula may represent chlorine or bromine. Chlorine compounds are more readily available and somewhat less expensive than the corresponding bromine compounds and are therefore usually preferred.

The subject reaction is usually conducted at temperatures determined largely by the exothermic nature of the reaction itself. The heat of reaction, though not usually great, will cause the temperature of the reaction mixture to rise from room temperature to about 35° to 40° C. within a relatively short time. The reaction will satisfactorily occur in the temperature range of —10° to 80° C., with the preferred range being about +10° to 60° C. Actually, the reaction will occur above 80° C. but, as the temperature is progressively raised, the danger of undesirable side reactions increases. At these high temperatures there is the possibility that polymerization of the butadiene may occur. There is further possibility that other undesirable side reactions may occur. In order to minimize and substantially eliminate the occurrence of reactions other than the principal one, the range of temperatures set forth above is employed in the subject method.

The time of reaction is not particularly critical. Any time from 10 minutes to 24 hours or more may be satisfactorily employed. Generally, the longer periods of time are used to assure maximum yields, although the substantial part of the reaction occurs in the shorter periods of time.

Atmospheric pressure is usually employed, largely as a matter of convenience. Pressure greater than atmospheric may be advantageously used with some improvements in yields usually observed. Apparently, pressures greater than atmospheric tend to keep the butadiene in the reaction medium longer and to restrict its premature exit from the proximity of its coreactant, the alkylhalomethyl sulfide. Therefore, the elevated pressures are frequently desirable to utilize more fully the butadiene which at the same time tends to increase the yield of the product.

A catalyst of the Friedel-Crafts type is needed in order to obtain an appreciable yield of product. The amount of catalyst used may be varied from about 0.5 to 15% by weight, the higher amounts generally causing higher yields, although sometimes at the uppermost part of the range the additional amounts of catalyst effect a minimal increase in yield. Usually, about 1% to 10%, by weight, of catalyst produces satisfactory results and such is the preferred range. Typical of the individual catalysts that may be employed are aluminum chloride, zinc chloride, zinc bromide, ferric chloride, titanium tetrachloride, stannic chloride, zinc stearate, and the like. In addition to a Friedel-Crafts catalyst, there may be present, in order to accelerate the reaction, glacial acetic acid, glacial formic acid, or the like.

If it is desired, a solvent may be employed although such is not necessary. The need or desire for a solvent is minimized by the use of glacial acetic acid, glacial formic acid, or the like since such serves as a solvent as well as an accelerator. If a solvent is desired, there may be used chloroform, ethylene dichloride, or other common chlorinated solvents.

The butadiene used in the instant reaction is introduced at any convenient rate, preferably at a rate that minimizes waste of materials. It is desirable that the butadiene be in slight excess in order to favor the principal reaction. However, a large excess should be avoided in order to prevent undesirable side reactions.

Compounds having a chemical configuration similar to that of butadiene may be employed in place of the butadiene to form similar products, although usually in reduced yields. Among the compounds that may be satisfactorily used are isoprene, hexadiene, cyclopentadiene, and the like.

At the conclusion of the reaction, after the alkylhalopentenyl sulfide has been formed, the reaction mixture is washed with water, aqueous 10% sodium carbonate, and water again. Solvent, water, and unreacted components are removed by stripping, and the product is distilled, preferably at reduced pressures down to about 0.5 mm.

The alkylhalopentenyl sulfides are liquid products that are useful as fungicides. The present compounds are particularly effective against *Stemphylium sarcinaeforme* and *Monilinia fructicola* in concentrations as low as 0.1% as demonstrated in standard fungicide tests. The alkylhalopentenyl sulfides may be reacted with sodium, potassium, or ammonium thiocyanate to form bactericidal and fungicidal compounds. They may be quaternized with trimethylamine or benzyldimethylamine to form bactericidal compounds effective against *Micrococcus pyrogenes* var. *aureus* and *Salmonella typhosa*. These sulfides may be reacted with sodium sulfite to yield effective dishwashing detergents. These alkylhalopentenyl sulfides may be reacted with alkyl mercaptans to form compounds useful as lubricating oil additives in the field of corrosion and oxidation inhibitors.

The method of making the alkylhalopentenyl sulfides according to the present invention is shown in the following illustrative examples in which parts by weight are used throughout.

Example 1

There were added 75 parts of methylchloromethyl sulfide, 10 parts of anhydrous zinc chloride, and 100 parts of glacial acetic acid to a three-necked flask equipped with a thermometer, stirrer, gas-dispersion tube, and water-cooled condenser fitted with a calcium chloride drying tube. To this mixture there was added 60 parts of butadiene over a period of about 15 minutes. Stirring of the reaction mixture was continued during the butadiene addition. An exothermic reaction was observed and the temperature of the reaction mixture rose to 40° C. in about two hours. Stirring of the reaction was continued for 16 additional hours during which time the heat of reaction gradually dissipated. The reaction mixture was washed with water twice, twice with aqueous 10% sodium carbonate, and once more with water. It was dried over anhydrous magnesium sulfate, filtered, stripped of light volatile components, and then distilled. The liquid product corresponded to methylchloropentenyl sulfide.

Example 2

There were added to a reaction vessel 120 parts of butylchloromethyl sulfide, 10 parts of anhydrous zinc stearate, and 100 parts of glacial formic acid. Butadiene, in the amount of 62 parts, was introduced during a period of about 12 minutes, while the mixture was stirred. An exothermic reaction was noticed, the heat from which was gradually dissipated by continued stirring over a perieod of six hours. The reaction mixture was washed twice with water, twice with aqueous 10% sodium carbonate, and once more with water. It was dried over anhydrous magnesium sulfate, filtered, stripped of light volatile components, and distilled. The liquid product corresponded to butylchloropentenyl sulfide.

Similarly, there was made isobutylchloropentenyl sulfide.

Example 3

To a mixture of 140 parts of octylchloromethyl sulfide, 10 parts of anhydrous zinc chloride, and 110 parts of glacial acetic acid there was added over a period of 20 minutes 70 parts of butadiene. The mixture was stirred during the addition of the butadiene and thereafter, during which time an exothermic reaction was noticed causing the temperature to rise to 38° C. Stirring was continued for 18 hours and the heat of reaction was gradually dissipated. The reaction mixture was washed twice with water, twice with aqueous 10% sodium carbonate, and once again with water. It was dried over anhydrous magnesium sulfate, filtered, stripped of light volatile components, and then distilled. The liquid product was identified as octylchloropentenyl sulfide.

In like manner there was prepared octylbromopentenyl sulfide.

Example 4

There were added together in a reaction vessel 159 parts of dodecylchloromethyl sulfide, 12 parts of anhydrous zinc chloride, and 125 parts of glacial acetic acid. Butadiene was introduced into the mixture, in the amount of 60 parts, over a period of 10 minutes. The mixture was stirred during the butadiene addition and thereafter for a period of 20 hours. An exothermic reaction was observed which caused the temperature to rise gradually to 35° C. Continued stirring during the period of 20 hours aided in the dissipation of the heat of reaction which caused the temperature to gradually subside and return to room temperature. The reaction mixture was washed twice with water, twice with aqueous 10% sodium carbonate, and once more with water. The reaction mixture was then dried over anhydrous magnesium sulfate, filtered, stripped of light volatile components, and then distilled. The liquid product distilled at 151° to 175° C. at 1.2 mm. and had a sulfur content of 9.8% (10.5% theoretical) and a chlorine content of 11.0% (11.6% theoretical). The product was identified as dodecylchloropentenyl sulfide.

Example 5

There were mixed together in a reaction vessel 252 parts of octadecylchloromethyl sulfide, 15 parts of anhydrous zinc stearate, and 140 parts of glacial formic acid. Over a period of 15 minutes 70 parts of butadiene was added during which time the reaction mixture was stirred. Thereafter, stirring was continued for 16 hours, after which the reaction mixture was washed twice with water, twice with aqueous 10% sodium carbonate, and once again with water. The mixture was then dried over anhydrous magnesium carbonate, filtered, stripped of light volatile components, and distilled. The product was identified as octadecylchloropentenyl sulfide.

I claim:

1. A method for preparing compounds having the formula $$RSCH_2CH_2CH=CHCH_2X$$

which comprises reacting with butadiene, in the presence of a Friedel-Crafts catalyst, compounds having the formula $RSCH_2X$, in which R is an alkyl group of one to eighteen carbon atoms and X is a member of the class consisting of chlorine and bromine.

2. A method for preparing compounds having the formula $$RSCH_2CH_2CH=CHCH_2X$$

which comprises reacting with butadiene, in the temperature range of $-10°$ to $80°$ C. in the presence of a Friedel-Crafts catalyst and a member of the class consisting of glacial acetic acid and glacial formic acid, compounds having the formula $RSCH_2X$, in which R is an alkyl group of one to eighteen carbon atoms and X is a member of the class consisting of chlorine and bromine.

3. A method for preparing compounds having the formula $$RSCH_2CH_2CH=CHCH_2Cl$$

which comprises reacting with butadiene, in the temperature range of $+10°$ to $60°$ C. in the presence of a Friedel-Crafts catalyst and glacial acetic acid, compounds having the formula $RSCH_2Cl$, in which R is an alkyl group of one to eighteen carbon atoms, and separating the product.

4. A method for preparing $$C_8H_{17}SCH_2CH_2CH=CHCH_2Cl$$

which comprises reacting butadiene with $C_8H_{17}SCH_2Cl$ in the temperature range of $+10°$ to $60°$ C. in the presence of a Friedel-Crafts catalyst and glacial acetic acid.

5. A method for preparing $$C_9H_{19}SCH_2CH_2CH=CHCH_2Cl$$

which comprises reacting butadiene with $C_9H_{19}SCH_2Cl$ in the temperature range of $+10°$ to $60°$ C. in the presence of a Friedel-Crafts catalyst and glacial acetic acid.

6. A method for preparing $$C_{12}H_{25}SCH_2CH_2CH=CHCH_2Cl$$

which comprises reacting butadiene with $C_{12}H_{25}SCH_2Cl$ in the temperature range of $+10°$ to $60°$ C. in the presence of a Friedel-Crafts catalyst and glacial acetic acid.

7. As new compositions of matter, compounds having the formula $$RSCH_2CH_2CH=CHCH_2X$$

in which R is an alkyl group of one to eighteen carbon atoms and X is a member of the class consisting of chlorine and bromine.

8. As new compositions of matter, compounds having the formula $$RSCH_2CH_2CH=CHCH_2Cl$$

in which R is an alkyl group of one to eighteen carbon atoms.

9. As new compositions of matter, compounds having the formula $$RSCH_2CH_2CH{=}CHCH_2Br$$

in which R is an alkyl group of one to eighteen carbon atoms.

10. As a new composition of matter, $$C_8H_{17}SCH_2CH_2CH{=}CHCH_2Cl$$

11. As a new composition of matter, $$C_9H_{19}SCH_2CH_2CH{=}CHCH_2Cl$$

12. As a new composition of matter, $$C_{12}H_{25}SCH_2CH_2CH{=}CHCH_2Cl$$

References Cited in the file of this patent

UNITED STATES PATENTS

| | | |
|---|---|---|
| 2,454,108 | Walling | Nov. 16, 1948 |
| 2,535,831 | Bell | Dec. 16, 1950 |
| 2,561,516 | Ladd et al | July 24, 1951 |
| 2,604,492 | Niederhauser | July 22, 1952 |